United States Patent [19]

Brandstetter et al.

[11] 4,419,478

[45] Dec. 6, 1983

[54] THERMOPLASTIC MOLDING MATERIALS

[75] Inventors: Franz Brandstetter, Neustadt; Adolf Echte, Ludwigshafen; Herbert Naarmann, Wattenheim; Edmund Priebe, Frankenthal, all of Fed. Rep. of Germany

[73] Assignee: BASF Aktiengesellschaft, Ludwigshafen, Fed. Rep. of Germany

[21] Appl. No.: 365,519

[22] Filed: Apr. 5, 1982

[30] Foreign Application Priority Data

Apr. 13, 1981 [DE] Fed. Rep. of Germany ....... 3114915

[51] Int. Cl.$^3$ ................................................ C08K 5/10
[52] U.S. Cl. .................................... 524/318; 524/284; 524/293; 524/300; 524/306; 524/311; 525/68; 525/905
[58] Field of Search ............... 524/293, 306, 311, 318, 524/284, 300, 31; 525/68, 905

[56] References Cited

U.S. PATENT DOCUMENTS 3,383,435  5/1968  Cizek ...................................... 525/68
4,174,325  11/1979 Pischtschan et al. ............... 524/318

Primary Examiner—J. Ziegler
Attorney, Agent, or Firm—Norbert M. Lisicki

[57] ABSTRACT

Thermoplastic molding materials based on impact resistant styrene polymers and polyphenylene ethers, containing an ester of an aliphatic monocarboxylic acid having 8 to 30 carbon atoms and an aliphatic or aromatic hydroxy compound having 1 to 6 hydroxyl groups.

5 Claims, No Drawings

THERMOPLASTIC MOLDING MATERIALS

BACKGROUND OF THE INVENTION

1. Field of the Invention

The invention relates to thermoplastic molding materials based on impact resistant styrene polymers and polyphenylene ethers.

2. Description of the Prior Art

Thermoplastic materials which are suitable for the manufacture of molded parts and which contain styrene polymers modified to be impact resistant and polyphenylene ethers are described, for instance, in U.S. Pat. Nos. 3,383,435; 4,128,602 and 4,128,603. Such molding materials are suited for the manufacture of molded parts characterized by a better dimensional stability when exposed to heat compared to styrene polymers modified to be impact resistant which are not mixed with polyphenylene ethers. The physical properties of such molding materials are generally satisfactory, but it has been found that they display an unsatisfactory flow behavior or with improved flow behavior they display reduced dimensional stability when exposed to heat.

SUMMARY OF THE INVENTION

The purpose of this invention was therefore the development of thermoplastic molding materials based on impact resistant styrene polymers and polyphenylene ethers which have improved flowability while maintaining the high dimensional stability when exposed to heat.

According to this invention this requirement is met by molding materials which contain 0.1 to 5 percent by weight of an ester of an aliphatic monocarboxylic acid with 8 to 30 carbon atoms and an aliphatic or aromatic hydroxy compound having 1 to 6 hydroxyl groups in addition to the impact resistant styrene polymers and the polyphenylene ethers.

DESCRIPTION OF THE PREFERRED EMBODIMENTS

Molding materials are understood to be unmolded mixtures which can be processed into molded parts or semi-finished goods by thermoplastic processing within a certain temperature range.

The molding materials may be present in the form of granules but they may also be present in the form of a powder or may be preformed by pelletizing or may be present in the form of foils and panels.

The thermoplastic molding materials may contain impact resistant styrene polymers and polyphenylene ethers in any desired quantities, for example in quantities of 5 to 90 percent by weight of styrene polymer and 95 to 10 percent by weight of polyphenylene ether. Particularly well suited for the preparation of molded parts are those molding materials which contain 20 to 80 percent by weight of impact resistant styrene polymer, and 80 to 20 percent by weight of polyphenylene ether.

The most frequently used processes for the manufacture of impact resistant styrene polymers are the polymerization processes in bulk or solution as described, for example, in U.S. Pat. No. 2,694,692 and processes for the bulk suspension polymerization, as described, for example, in U.S. Pat. No. 2,862,906. However, processes such as emulsion polymerization may also be used.

Possible monovinyl aromatic compounds are particularly styrene, and further the nucleus or side-chain alkylated styrenes. Preferably, however, styrene is used alone.

Suitable rubbers include polymers, the glass temperature of which lies below 0° C., preferably below −20° C. Suitable rubbers in the sense of this invention include polybutadiene, polyisoprene and mixed polymers of butadiene and/or isoprene with styrene, alkyl esters of acrylic acid with 2 to 8 carbon atoms in the alkyl radical and with acrylonitrile, polymers of alkyl ester of acrylic acid with 2 to 8 carbon atoms in the alkyl radical, polyisobutylene and rubbers based on ethylene-propylene-diene, in addition to natural rubber.

Particularly well suited are butadiene polymers with a 1,4-cis content which lies between 25 and 98 percent. The polystyrenes modified to be impact resistant can be prepared in bulk, in solution, in bulk-suspension, and in emulsion. Preferably the substances are prepared by polymerization of the monovinyl aromatic compounds in the presence of the rubber. As already mentioned, the polymerization generally takes place in a well known manner in bulk solution or aqueous dispersion with the rubber initially having been soft in the polymerizable monomers and this starting solution then being polymerized.

The polyethers are compounds based on polyphenylene oxides, di-substituted in the ortho position, with the ether oxygen of the one unit being bonded to the benzene nucleus of the adjacent unit. At least 50 units should be bonded to each other. In the ortho position to the oxygen, the polyethers may contain hydrogen, halogen, hydrocarbons which do not have tertiary hydrogen atoms in the alpha position, halogenated hydrocarbons, phenyl radicals, and hydrocarbon-oxy radicals. Thus, the following can be used: poly(2,6-dichloro-1,4-phenylene)-ether, poly(2,6-diphenyl-1,4-phenylene)-ether, poly(2,6-dimethoxy-1,4-phenylene)-ether, poly(2,6-dimethyl-1,4-phenylene)-ether, and poly(2,6-dibromo-1,4-phenylene)-ether. Poly(2,6-dimethyl-1,4-phenylene)-ether is used on a preferred basis. Particularly preferred are poly(2,6-dimethyl-1,4-phenylene)-ethers with a limiting viscosity between 0.40 and 0.65 dl/gram (measured in chloroform at 30° C.).

The aromatic polyethers may be manufactured by self-condensation of the corresponding monofunctional phenols by the action of oxygen in the presence of a catalyst system, as described for instance in U.S. Pat. Nos. 3,219,625; 3,257,357; 3,306,874; 3,306,875; 3,956,442; 3,965,069; and 3,972,851.

Suitable esters for use in the molding materials according to this invention include reaction products of alcohols and polyols with 1 to 6 hydroxyl groups with up to 30 carbon atoms, such as lauryl alcohol, stearyl alcohol, ethylene glycol, glycerine, pentaerythritol, hexanetriol, mannitol, sorbitol, or aromatic hydroxy compounds such as Bisphenol A, tetramethyl Bisphenol A, hydroquinone and others, and aliphatic monocarboxylic acids with 8 to 30 carbon atoms, such as capric acid, lauric acid, tridecanic acid, palmitic acid, margaric acid, myristinic acid, stearic acid, 10-methyl stearic acid, behenic acid, cerotinic acid, oleic acid and linoleic acid.

Particularly well suited alcohols and polyols are stearyl alcohol, pentaerythritol, sorbitol, Bisphenol A and tetramethyl Bisphenol A. Among the monocarboxylic acids, palmitic acid, myristinic acid and stearic acid are particularly preferred.

Esters to be used in accordance with this invention include stearyl palmitate, stearyl stearate, pentaerythritol tetrastearate, sorbitol stearate, Bisphenol A stearate and others.

Stearyl stearate is particularly preferred. The esters are produced in accordance with well known processes such as those put forth in Houben-Weyl, Methods of Organic Chemistry; Georg-Thieme Publishers, Stuttgart, 1952, Volume VIII, page 516 and the following; and in "The Chemistry of the Hydroxyl Group,": Part 1, pages 453–503 (1971), Interscience Publishers (London, New York, Sydney, Toronto) by S. Patai.

The thermoplastic molding materials contain 0.1 to 5 percent by weight, preferably 0.5 to 2 percent by weight, of the esters according to this invention. Either a single ester or an ester mixture may be used.

The mixtures of the impact resistant styrene polymers, the polyphenylene ethers and the ester or esters can also contain further additives, such as pigments, dyestuffs, fillers, flame retardants, either compatible polymers, antistatics, antioxidants and additional lubricating agents.

The thermoplastic molding materials according to this invention are manufactured by using commonly applied equipment permitting homogeneous mixing, such as kneaders, extruders, or roller mixing devices. In addition to generally good properties, the molding materials according to this invention have an improved flowability and high dimensional stability when exposed to heat.

The following Examples are intended to exemplify the invention. All parts are by weight unless otherwise indicated.

EXAMPLES AND COMPARISON EXAMPLES

The parts by weight of impact resistant polystyrene listed in the table with a flexible component having an average particle size of 1 micron, a poly(2,6-dimethyl-1,4-phenylene)-ether having a limited viscosity of 0.60 dl/g (measured in chloroform at 30° C.) and of stearyl stearate were melted in a two-shaft extruder at 280° C., homogenized, mixed and granulated with 0.8 parts by weight of tris(nonylphenyl)-phosphite, and 1,5 parts by weight of polyethylene having a melting viscosity of 1,200 centistokes.

The Vicat softening point was determined according to DIN 53 460/B and the melting index was determined according to DIN 53 735.

TABLE

|  | Polystyrene Modified to be Impact Resistant [pbw] | Poly(2,4-dimethyl-1,4-phenylene)-ether [pbw] | Stearyl Stearate [pbw] | Softening Point According to Vicat [°C.] | Melting Index 21.6 kp at 250° C. [g/10 Mins.] |
|---|---|---|---|---|---|
| Example (According to the Invention) | | | | | |
| 1 | 75 | 24.5 | 0.5 | 115 | 86 |
| 2 | 75 | 24 | 1 | 115 | 116 |
| 3 | 65 | 34 | 1 | 125 | 65 |
| 4 | 55 | 44.5 | 0.5 | 136 | 13 |
| 5 | 55 | 44 | 1 | 136 | 13 |
| Comparison Examples | | | | | |
| A | 75 | 25 | 0 | 115 | 57 |
| B | 65 | 35 | 0 | 125 | 33 |
| C | 55 | 45 | 0 | 136 | 9 |
| D | 50 | 45 | Triphenyl-phosphate [5 parts by weight] | 125 | 58 |

The embodiments of the invention in which an exclusive privilege or property is claimed are defined as follows:

1. A thermoplastic molding material based on impact resistant styrene polymer prepared by the polymerization of monostyrene in the presence of polybutadiene rubber and polyphenylene ether wherein the molding material contains 0.1 to 5 percent by weight, based on the weight of the mixture of the styrene polymer and the polyphenylene ether, of an ester of an aliphatic monocarboxylic acid having 8 to 30 carbon atoms and an aliphatic or aromatic hydroxy compound having 1 to 6 hydroxyl groups and homogeneously mixing said molding material.

2. The thermoplastic molding material of claim 1 wherein the ester is selected from the group consisting of stearyl stearate, stearyl palmitate, pentaerythritol tetrastearate, sorbitol stearate and Bisphenol A stearate.

3. The thermoplastic molding material of claim 1 wherein the ester is stearyl sterate.

4. The thermoplastic molding material of claim 1 wherein said material contains 0.5 to 2 percent by weight of said ester.

5. The thermoplastic molding material of claim 2 wherein said material contains 0.5 to 2 percent by weight of said ester.

* * * * *